(12) United States Patent
Park et al.

(10) Patent No.: US 11,867,803 B2
(45) Date of Patent: Jan. 9, 2024

(54) GLOBAL POSITIONING SYSTEM FOR COMPENSATING FOR ERROR OF RELATIVE POSITION BETWEEN VEHICLES

(71) Applicant: INDUSTRY-ACADEMIA COOPERATION GROUP OF SEJONG UNIVERSITY, Seoul (KR)

(72) Inventors: Byung Woon Park, Seoul (KR); Eun Yeong Lee, Seoul (KR); Cheol Soon Lim, Bucheon-si (KR); Hyo Jung Yoon, Seoul (KR)

(73) Assignee: INDUSTRY-ACADEMIA COOPERATION GROUP OF SEJONG UNIVERSITY, Seoul (KR)

( * ) Notice: Subject to any disclaimer, the term of this patent is extended or adjusted under 35 U.S.C. 154(b) by 277 days.

(21) Appl. No.: 17/455,968

(22) Filed: Nov. 22, 2021

(65) Prior Publication Data
US 2022/0171053 A1    Jun. 2, 2022

(30) Foreign Application Priority Data
Nov. 30, 2020   (KR) ......................... 10-2020-0163925

(51) Int. Cl.
*G01S 13/93*        (2020.01)
*G01S 13/931*       (2020.01)
*B60W 30/095*       (2012.01)

(52) U.S. Cl.
CPC ....... *G01S 13/931* (2013.01); *B60W 30/0953* (2013.01); *B60W 30/0956* (2013.01);
(Continued)

(58) Field of Classification Search
CPC .......... G01S 13/931; G01S 2013/9316; G01S 2013/9321; G01S 2013/9325; G01S 19/04;
(Continued)

(56) References Cited

U.S. PATENT DOCUMENTS

2015/0338520 A1* 11/2015 Boriskin ................. G01S 19/04
                                                      342/357.51

FOREIGN PATENT DOCUMENTS

| AU | 2004316166 A1 * | 9/2005 | ............. G01S 19/04 |
| CA | 2802445 A1 * | 12/2011 | ............. G01S 19/47 |

(Continued)

OTHER PUBLICATIONS

Thomas Speth et al., "Enhanced Inter-Vehicular Relative Positioning", 2016 IEEE 19th International Conference on Intelligent Transportation Systems (ITSC), Nov. 1-4, 2016, 6pages.
(Continued)

*Primary Examiner* — Hung Q Nguyen
(74) *Attorney, Agent, or Firm* — Sughrue Mion, PLLC

(57) ABSTRACT

The present disclosure relates to a global positioning system for compensating for relative positioning errors between vehicles. A follower vehicle of the global positioning system includes a correction message receiver configured to receive correction message including velocity information about a leader vehicle and GNSS raw measurements of the leader vehicle from the leader vehicle, a relative positioning result calculator configured to calculate a relative positioning result between the leader vehicle and the follower vehicle based on the GNSS measurements of the leader vehicle, and a relative positioning result corrector configured to calculate a corrected relative positioning result through an operation based on the calculated relative positioning result and the velocity information about the leader vehicle.

10 Claims, 5 Drawing Sheets

(52) U.S. Cl.
CPC ............... *G01S 2013/9316* (2020.01); *G01S 2013/9321* (2013.01); *G01S 2013/9325* (2013.01)

(58) Field of Classification Search
CPC .......... G01S 19/14; G01S 19/43; G01S 19/51; G01S 5/0072; B60W 30/0953; B60W 30/0956; G05D 1/0278
See application file for complete search history.

(56) References Cited

FOREIGN PATENT DOCUMENTS

| | | | | |
|---|---|---|---|---|
| CN | 101743453 A | * | 6/2010 | ........... G01C 21/005 |
| EP | 3293549 A1 | * | 3/2018 | ............. G01S 19/42 |
| KR | 10-1160957 B1 | | 6/2012 | |
| KR | 10-1326889 B1 | | 11/2013 | |
| KR | 10-1429474 B1 | | 8/2014 | |
| KR | 10-1851853 B1 | | 4/2018 | |
| KR | 10-2052364 B1 | | 12/2019 | |
| WO | WO-2018222274 A1 | * | 12/2018 | ............. G01S 19/07 |

OTHER PUBLICATIONS

"For Network-RTK, PPP and PPP-RTK", Geo++ SSR Flyer Version 3, Sep. 2015, 2pages.
Kaifei He, "GNSS Kinematic Position and Velocity Determination for Airborne Gravimetry", 2015, 184pages.
Yoon Hyo Jong, "Message Design and Scheduling for the Relative Precise Positionaing Solution Based on Moving Baseline Method", 68pages.

* cited by examiner

[FIG. 1]
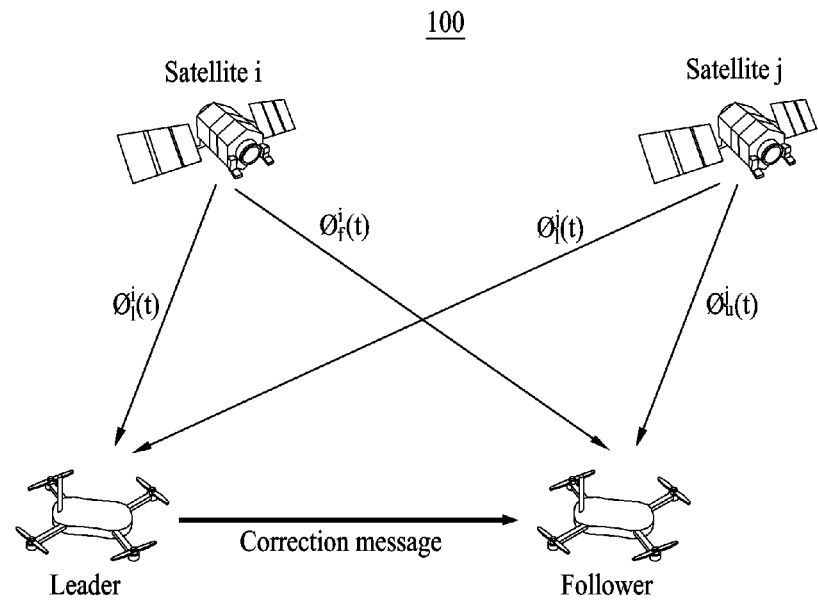
[FIG. 2]
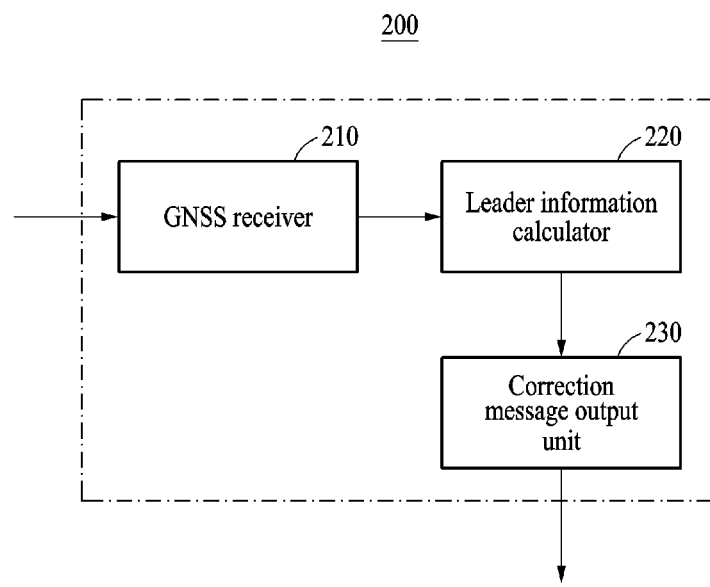

[FIG. 3]
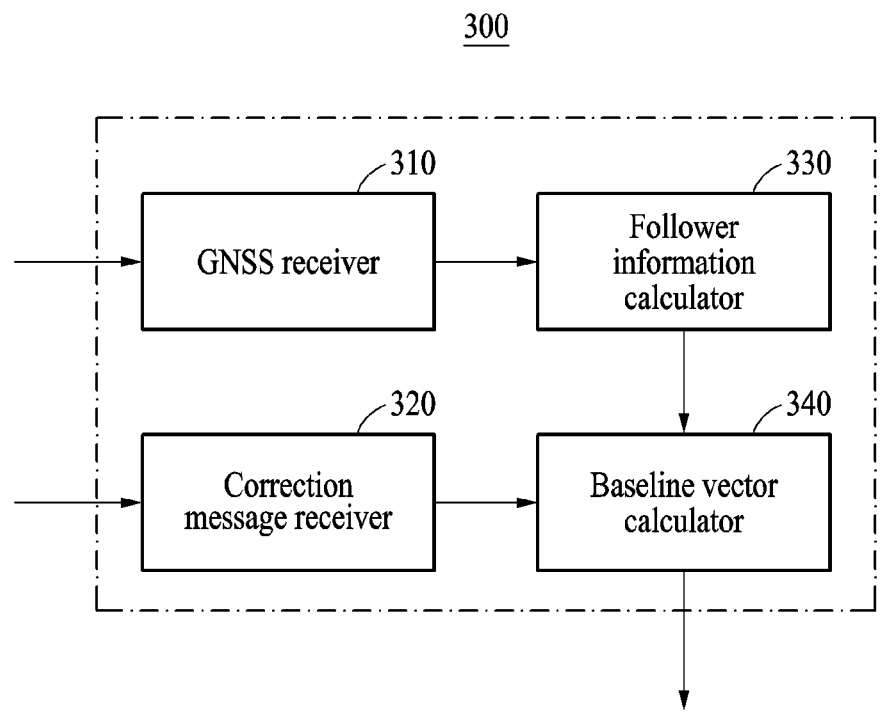
[FIG. 4]
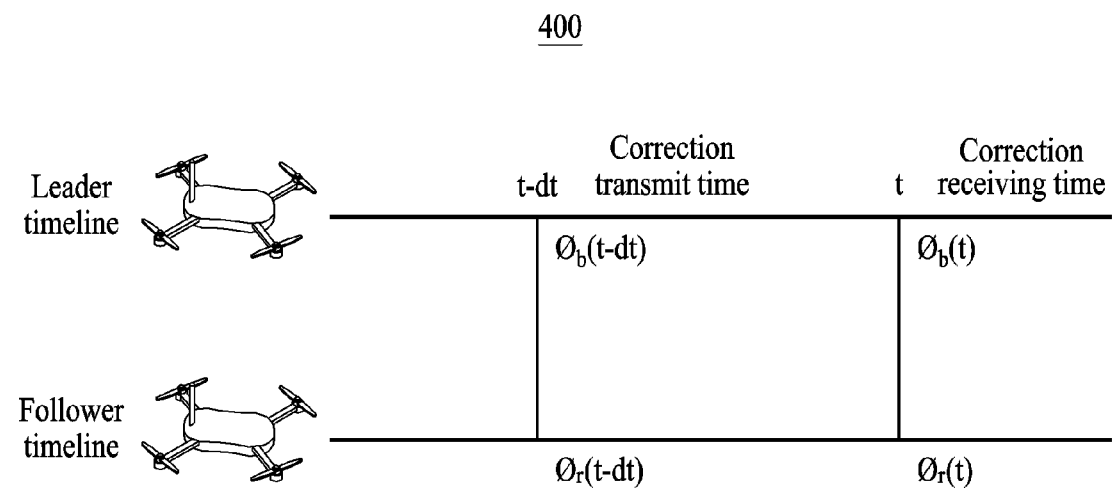

[FIG. 5]
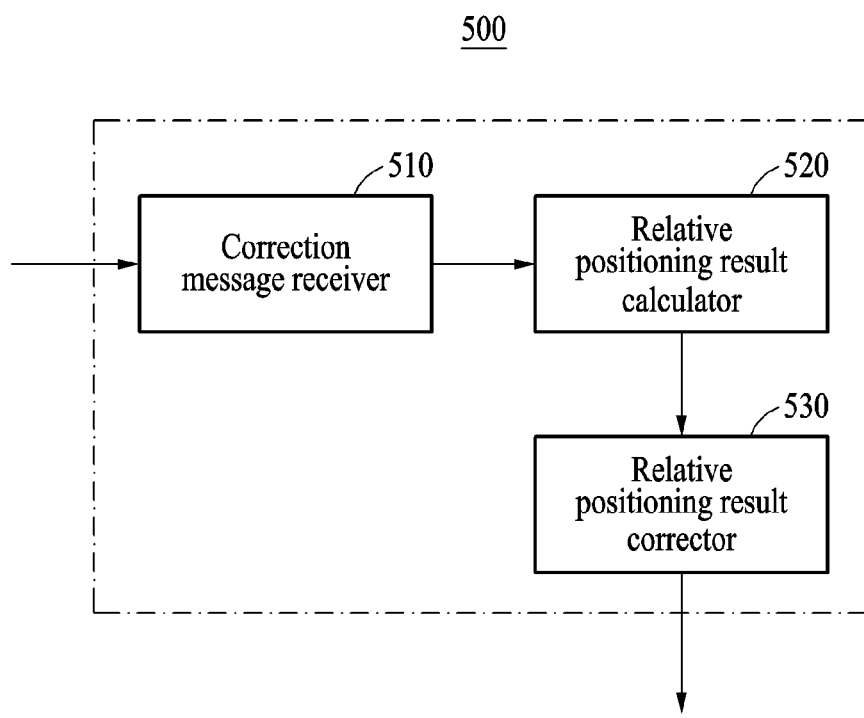
[FIG. 6]
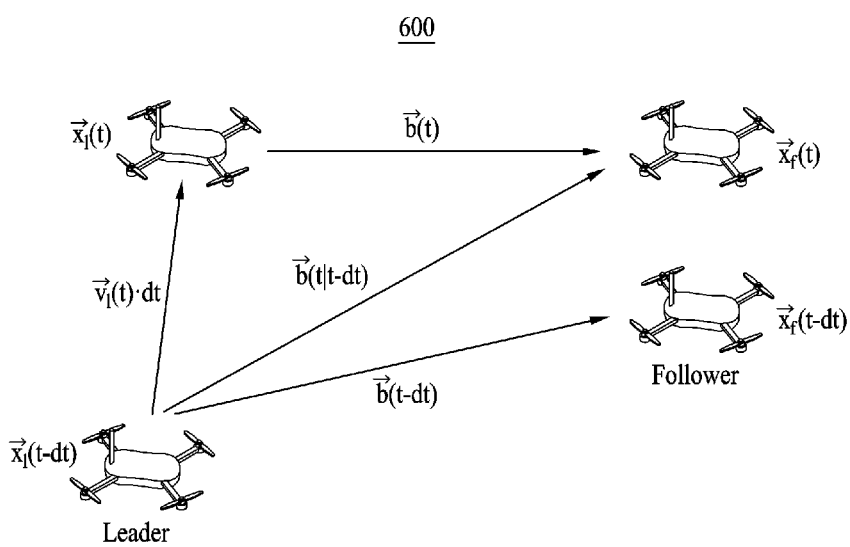

[FIG. 7A]
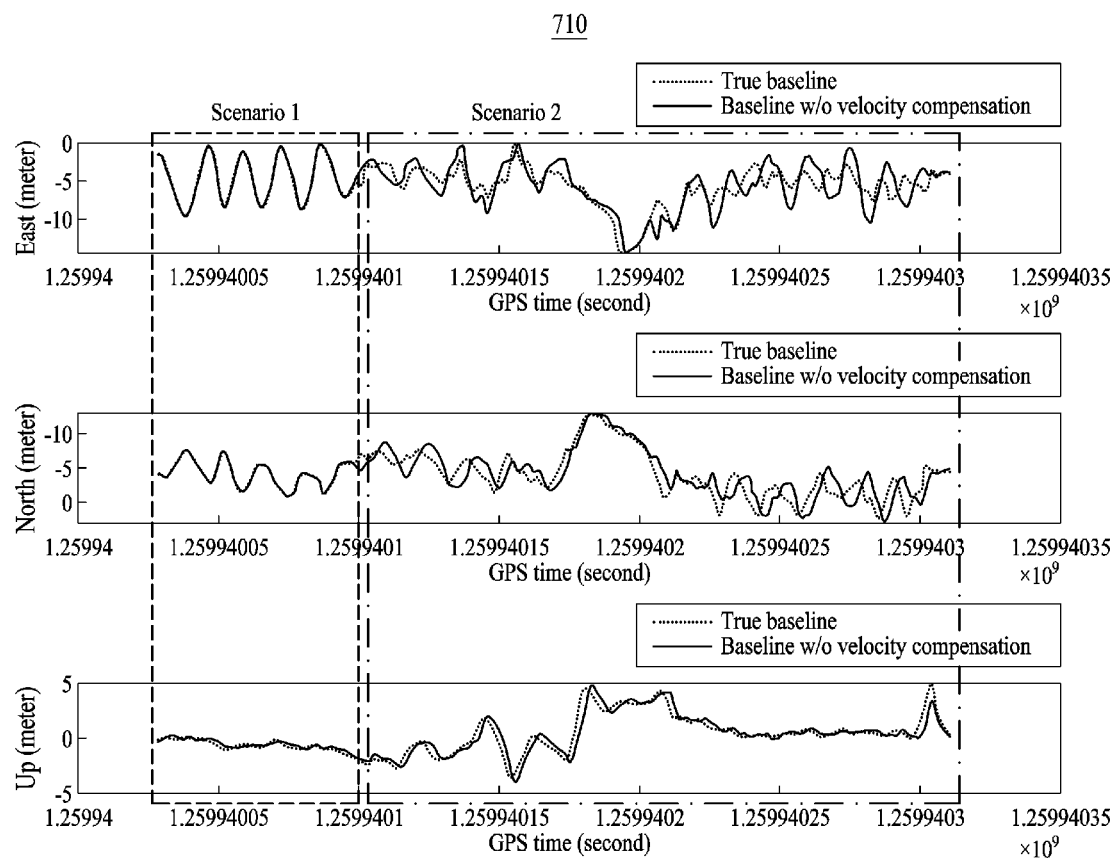

[FIG. 7B]
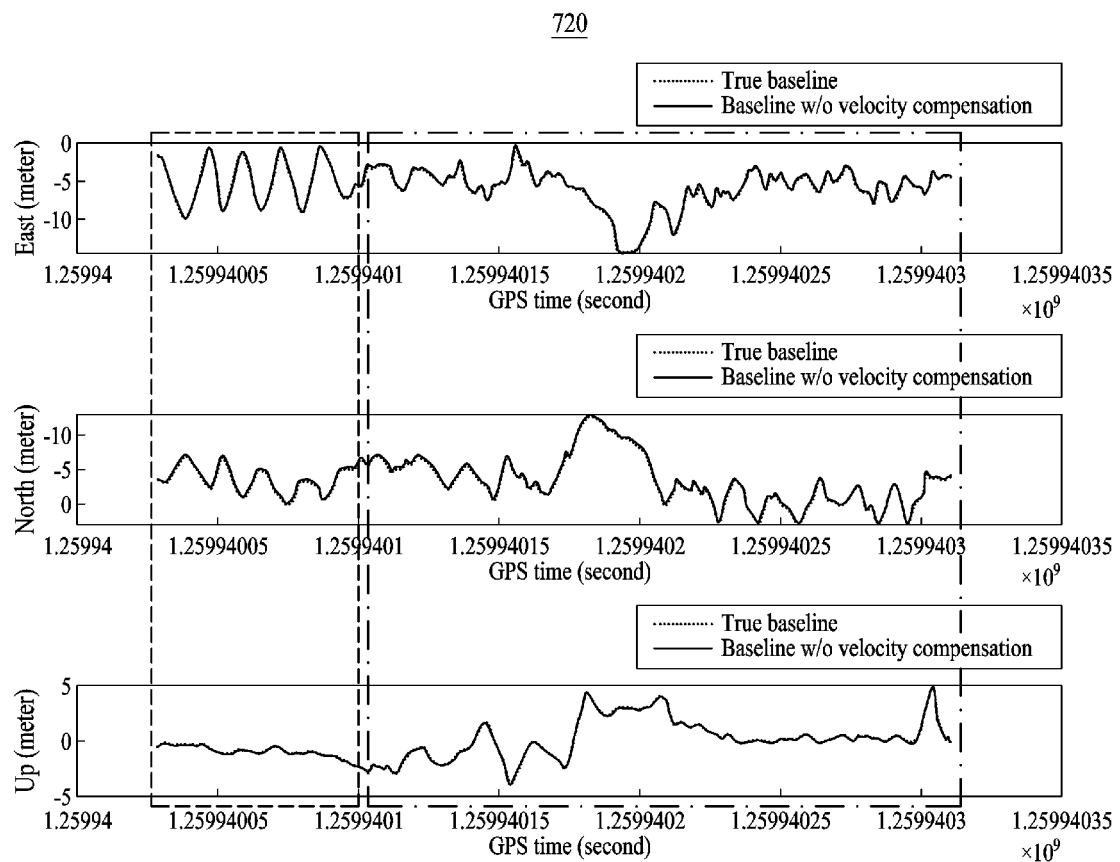

GLOBAL POSITIONING SYSTEM FOR COMPENSATING FOR ERROR OF RELATIVE POSITION BETWEEN VEHICLES

CROSS-REFERENCE TO RELATED APPLICATION

This application claims priority to and the benefit of Korean Patent Application No. 10-2020-0163925, filed on Nov. 30, 2020, the disclosure of which is incorporated herein by reference in its entirety.

BACKGROUND

Field of the Invention

The present disclosure relates to a global positioning system, and more particularly, to a technical idea for compensating for an error in relative position between vehicles.

Description of the Related Art

Real time kinematics (RTK), which is one of precise positioning methods using global positioning carrier phase measurement, can identify the position in centimeters (cm), and is thus recently used for precise navigation and control of drones.

In the case of single-reference station RTK using a ground reference station, the position of the reference station is fixed on the ground, and a carrier phase measurement obtained from a satellite by the reference station is transformed into RTCM-type correction message and transmitted to the user.

However, in the case of drones configured to perform missions at a location far from the ground infrastructure, correction message may fails to be received due to communication problems, and the accuracy of the absolute position of each drone at a point at a distance of about 10 km or more from the reference station may not be guaranteed.

In actual operation of a large number of drones, relative position accuracy is as important as absolute position for the purpose of swarm flight and collision avoidance between drones.

In other words, after all the drones in operation receive correction message from the reference station infrastructure, the relative positions of the drones can be calculated by differentiating each positioning result from other's. However, as the distance of a drone from the reference station on the ground increases, the reception rate of the correction message and the accuracy of the position is degraded, which may cause an issue in precise drone operation.

Therefore, a leader vehicle (i.e., the reference drone) is required to transmit correction message including its own position and a carrier phase measurement like the reference station to calculate the correct relative position at the corresponding point.

In this operation, the measurement time of the reference station should be aligned with that of the user in order to apply the RTK technique. Accordingly, a follower vehicle receiving only correction message for time t-dt without correction message for the current time t from the leader may acquire only the baseline vector from the leader to the follower even if it has received the global positioning measurement at the current time t.

The conventional RTK technique compensates for only a user's dynamic movement on the assumption that the reference station is stationary, and there is a limitation in applying the technology to a clustered mobile object in which the leader vehicle serving as a reference station continuously moves. That is, in order to apply the conventional stationary reference station-based RTK to precise relative positioning between mobile objects, not only calculation of the baseline at time t-dt but also compensation for the movement of the leader vehicle (i.e., the reference vehicle) is required. Thus, there is a need for a technique for quickly compensating for the baseline vector estimated at t-dt.

PRIOR ART LITERATURE

Patent Documents

Korean Patent No. 10-0443550, titled "IMU-GPS INTEGRATED SYSTEM INCLUDING ERROR CORRECTION SYSTEM, METHOD FOR REDUCING SEARCH SPACE OF INTEGER AMBIGUITY, METHOD FOR DETECTING CYCLE SLIP, AND POSITION, VELOCITY, ATTITUDE DETERMINATION METHOD USING THE SAME"

Korean Patent No. 10-1851853, titled "SYSTEM AND METHOD TO CALCULATE RELATIVE POSITION BETWEEN VEHICLES"

SUMMARY OF THE INVENTION

Therefore, the present disclosure has been made in view of the above problems, and it is an object of the present disclosure to provide a global positioning system capable of improving the accuracy of a relative positioning result between vehicles by compensating for an error caused by movement of a leader vehicle serving as a reference station.

In accordance with an aspect of the present invention, the above and other objects can be accomplished by the provision of a follower vehicle of a global positioning system, including: a correction message receiver configured to receive correction message including velocity information about a leader vehicle and GNSS raw measurements of the leader vehicle from the leader vehicle; a relative positioning result calculator configured to calculate a relative positioning result between the leader vehicle and the follower vehicle based on the GNSS raw measurements of the leader vehicle; and a relative positioning result corrector configured to calculate a corrected relative positioning result through an operation based on the calculated relative positioning result and the velocity information about the leader vehicle.

In accordance with an aspect, the GNSS raw measurements of the leader vehicle may include at least one of a pseudorange measurement, a carrier measurement, or a Doppler measurement for the leader vehicle received from at least one satellite.

In accordance with an aspect, the leader vehicle may calculate the velocity information about the leader vehicle through an operation based on a line-of-sight vector of the satellite calculated based on a position of the leader vehicle and the Doppler measurement for the leader vehicle.

In accordance with an aspect, the leader vehicle may calculate the velocity information about the leader vehicle through a difference between position information about the leader vehicle at a first preset time and position information about the leader vehicle at a second preset time.

In accordance with an aspect, the leader vehicle may include an inertial navigation system, wherein the leader vehicle calculates the velocity information about the leader vehicle using the inertial navigation system.

In accordance with an aspect, the relative positioning result corrector may calculate the corrected relative positioning result through an operation based on a correction age according to reception of the calculated relative positioning result, the velocity information about the leader vehicle, and the correction message.

In accordance with an aspect, the relative positioning result calculator may calculate the relative positioning result using a standard format for the positioning result, the standard being national marine electronics association (NMEA).

In accordance with an aspect, the correction message may further include position information about the leader vehicle.

In accordance with an aspect, the leader vehicle may output the velocity information about the leader vehicle and the GNSS raw measurements of the leader vehicle in an asynchronous manner.

In accordance with an aspect, the leader vehicle may output the velocity information about the leader vehicle at a higher rate than the GNSS raw measurements of the leader vehicle.

According to an embodiment of the present disclosure, the accuracy of the relative positioning result between vehicles may be improved by compensating for an error caused by the movement of a leader vehicle serving as a reference station.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram illustrating a global positioning system according to one embodiment;

FIG. 2 is a diagram illustrating a leader according to an embodiment;

FIG. 3 is a diagram illustrating a follower according to an embodiment;

FIG. 4 is a diagram illustrating a first operation example of a global positioning system according to an embodiment;

FIG. 5 is a diagram illustrating a follower according to another embodiment;

FIG. 6 is a diagram illustrating a second operation example of the global positioning system according to the one embodiment; and FIGS. 7A and 7B depict a result of relative positioning between vehicles calculated through a global positioning system according to one embodiment.

DETAILED DESCRIPTION OF THE INVENTION

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the scope of rights according to the concept of the present invention.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" in the specification should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure will now be described more fully with reference to the accompanying drawings, in which exemplary embodiments of the invention are shown. This disclosure may, however, be embodied in many different forms and should not be construed as limited to the exemplary embodiments set forth herein. Like reference numerals in the drawings denote like elements.

FIG. 1 is a diagram illustrating a global positioning system according to one embodiment.

Referring to FIG. 1, a global positioning system 100 may calculate a time-delayed relative position baseline vector by transmitting correction message of a leader vehicle to a follower vehicle, and calculate a relative position baseline vector by compensating for a correction age based on the velocity information about the leader.

In addition, the global positioning system 100 may improve the accuracy of a relative positioning result between the vehicles by compensating for an error caused by the movement of the leader serving as a reference station.

Specifically, the global positioning system 100 may extend and use stationary measurement or RTK technique operated with the reference station remaining stationary to a precise relative positioning technique in a cluster operation in which multiple vehicles are all moved.

In particular, the global positioning system 100 may provide an accurate relative positioning result between vehicles by compensating for the RTK positioning result, which is commonly used, instead of using the GNSS raw data or a moving baseline RTK technique used exclusively or for a fee.

To this end, the global positioning system 100 may include at least one satellite i, j and a plurality of vehicles (leader, follower). For example, the plurality of vehicles may include at least one leader and at least one follower.

In FIG. 1, at least one satellite (satellite i, j) is described as two satellites, but the present disclosure is not limited thereto. The at least one satellite may mean one or three or more satellites.

In addition, one leader may be linked to at least one follower to form one group.

Each of the at least one satellite i, j may provide GNSS raw measurements such as a carrier phase measurement Ø to at least one vehicle between the leader and the follower.

The leader is a reference vehicle (i.e., reference station) serving to transmit correction message for a relative position between multiple vehicles (at least one follower). The leader may transmit to the follower correction messages including GNSS raw measurements of the leader, velocity information and position information calculated in consideration of the movement of the leader.

In one aspect, the leader may transmit the velocity information of the correction message at a different rate than the other information, thereby drastically reducing the size of the bandwidth and power consumption compared to the conventional technology, which requires a wide communication bandwidth and high power consumption.

Specifically, in the case of high-moving vehicles, position information should be provided quickly at short intervals of 10 Hz or more. Thus, GNSS raw measurements of correction message must be output with the same periodicity as the output position information. To this end, it is necessary to increase the communication bandwidth for transmission of the correction message, which is not efficient because it is accompanied by expensive equipment and power consumption.

In order to address the issue related to the bandwidth and power consumption, a leader according to an embodiment may output velocity information in an asynchronous manner. Preferably, the leader may output velocity information at a higher rate than global positioning information.

The follower may perform precise relative positioning with the leader based on the correction message received from the leader.

Specifically, the follower may calculate a baseline vector obtained by compensating for the correction age dt based on the correction message reflecting the velocity information about the leader and the velocity information about the follower.

For example, the correction age dt may mean a time difference between a time t-dt at which the leader outputs correction message and a current time t at which the follower receives the correction message.

The follower reflects the correction age dt of the correction message in the velocity information about the leader included in the received correction message, and calculate a relative positioning result in which an error caused by the movement of the leader is corrected, based on the velocity information about the leader reflecting the correction age dt.

The global positioning system according to the embodiment will be described in more detail with reference to FIGS. 2 to 7B according to embodiments.

FIG. 2 is a diagram illustrating a leader according to an embodiment. Referring to FIG. 2, a leader 200 according to the embodiment may include a global positioning receiver 210, a leader information calculator 220, and a correction message output unit 230.

The global positioning receiver 210 according to the embodiment may receive GNSS raw measurements of the leader 200 from at least one satellite.

For example, the GNSS raw measurements may include at least one of a pseudorange measurement, a carrier phase measurement, and a Doppler measurement for the leader 200, but is not limited thereto. The GNSS raw measurements may include known information that a terminal can receive from the satellite.

The leader information calculator 220 according to an embodiment may calculate velocity information about the leader 200 based on the received global positioning information.

In one aspect, the leader information calculator 220 may calculate the velocity information about the leader 200 by differentiating the received pseudorange measurement and/or the carrier measurement.

In addition, the leader information calculator 220 may calculate the velocity information about the leader 200 using an inertial navigation system.

Preferably, the leader information calculator 220 may calculate the velocity information about the leader 200 through an operation based on the line-of-sight vector of the satellite calculated based on the position of the leader 200 and the Doppler measurement for the leader 200.

The correction message output unit 230 according to the embodiment may output correction message including the GNSS raw measurements and the calculated velocity information to a follower.

In one aspect, the follower may calculate a baseline vector with the correction age dt compensated through an operation based on the output correction message and the velocity information about the follower.

In one aspect, the correction message output unit 230 may output the GNSS raw measurements and the calculated velocity information in an asynchronous manner.

Preferably, the correction message output unit 230 may output the velocity information at a higher rate than the global positioning information.

For example, the global positioning system that aims to output the baseline vector at a rate of 100 Hz may send the GNSS raw measurements in the correction messages, which is directly involved in calculating the baseline vector such as the pseudorange measurement, carrier measurement, and Doppler measurement, at 1 Hz, and send the velocity information about the leader at 100 Hz. Thereby, the output of the relative position of the follower at 100 Hz may be sufficiently guaranteed even with the correction message bandwidth used in the conventional 1 Hz low-rate output system configuration.

In other words, the correction message output unit 230 may schedule the timing of the output correction message, and may minimize data throughput and power consumption by transmitting the global positioning information, which has a large data size, at a low rate and the velocity information at a high speed.

The leader information calculator 220 may calculate the position information about the leader based on the received GNSS raw measurements, and the correction message output unit 230 may output correction message including the calculated position information to the follower.

FIG. 3 is a diagram illustrating a follower according to an embodiment.

Referring to FIG. 3, a follower 300 according to the embodiment may include a GNSS receiver 310, a correction message receiver 320, a follower information calculator 330, and a baseline vector calculator 340.

The GNSS receiver 310 according to the embodiment may receive GNSS raw measurements from at least one satellite.

For example, the GNSS raw measurements may include at least one of a pseudorange measurement, a carrier measurement, or a Doppler measurement for the follower 300, but is not limited thereto. The GNSS raw measurements may include known information that the terminal can receive from the satellite.

The correction message receiver 320 according to the embodiment may receive correction message including velocity information about a leader.

For example, the correction message receiver 320 may receive the correction message from the leader described with reference to FIG. 2.

In one aspect, the correction message receiver 320 may receive velocity information about the leader and GNSS raw measurements of the leader, which are received in an asynchronous manner, as correction message.

The follower information calculator 330 according to the embodiment may calculate velocity information about a follower based on the received global positioning information.

In one aspect, the follower information calculator 330 may calculate the velocity information about the follower 300 by differentiating the pseudorange measurement and/or the carrier measurement.

In addition, the follower information calculator 330 may calculate the velocity information about the follower 300 using an inertial navigation system.

Preferably, the follower information calculator 330 may calculate the velocity information about the follower 300 through an operation based on the line-of-sight vector of the satellite calculated based on the position of the follower and a Doppler measurement for the follower.

The baseline vector calculator 340 according to the embodiment may calculate a baseline vector, formed by compensating for the correction age dt, through an operation based on the received correction message and velocity information about the follower.

In one aspect, the baseline vector calculator 340 may calculate the baseline vector through a difference between the carrier phase measurement for the follower and the carrier phase measurement for the leader in the received correction message.

In addition, the baseline vector calculator 340 may differentiate the velocity information about the follower 300 and the received velocity information about the leader, and calculate a baseline vector with the correction age dt compensated through an operation based on the differential velocity information and the calculated baseline vector.

In one aspect, when the correction message is received in an asynchronous manner, the baseline vector calculator 340 may calculate a baseline vector with the correction age dt compensated based on the sampling time interval information about the velocity information about the leader.

FIG. 4 is a diagram illustrating a first operation example of a global positioning system according to an embodiment.

Referring to FIG. 4, reference numeral 400 denotes timelines for a leader and a follower according to an embodiment according to the first operation example.

According to reference numeral 400, a baseline vector $\vec{x}(t-dt)$ between vehicles may be calculated based on the difference between the measurements received from the two vehicles at the same time. That is, the baseline vector $\vec{x}(t-dt)$ may be calculated based on the difference between the carrier phase measurement $\Phi_r(t-dt)$ for the follower and the carrier phase measurement $\Phi_b(t-dt)$ for the leader at time t–dt, which is the time when the leader outputs correction message.

For a vehicle moving at a high speed, the time delay effect due to the correction age dt is relatively large. Accordingly, the correction age dt must be reduced as much as possible. To this end, the positioning results must be output at a high rate of 100 Hz. However, for the high-rate positioning information, correction message for differential positioning must be output at a high rate, which may be a heavy burden on both the leader and the follower in terms of power and data communication.

In this regard, in the global positioning system according to an embodiment, a leader may calculate velocity information thereabout and transmit the calculated velocity information and GNSS raw measurements as correction message to a follower at time t–dt, by outputting the velocity information at a higher rate than the global positioning information. Thereby, data throughput and power consumption may be minimized.

In addition, the follower may calculate a baseline vector with the correction age dt compensated through an operation based on the correction message received from the leader and the velocity information about the follower.

For example, the leader may be the leader described with reference to FIG. 2, and the follower may be the follower described with reference to FIG. 3.

Specifically, the leader and the follower may calculate the velocity information thereabout through an operation based on the line-of-sight vector $\vec{e}$ and a Doppler measurement $\lambda \dot{\Phi}^i$.

Specifically, the velocity information about the leader may be calculated in Equation 1 below, and the velocity information about the follower may be calculated in Equation 2 below.

$$\vec{e} \cdot (\vec{v_b} + \vec{\delta v_b}) - \dot{B}_b = \vec{e} \cdot \vec{R}^i - \dot{b}^i - \lambda \dot{\Phi}_b^s \qquad \text{[Equation 1]}$$

where $\vec{v}_b$ is velocity information about the leader, $\vec{\delta v}_b$ is a velocity estimate error, $\vec{e}$ is a line-of-sight vector, $\dot{B}_b$ is a drift of the clock error of the leader, $\vec{R}^i$ and $\dot{b}^i$ are the satellite orbital velocity and the change rate of the satellite clock error, and $\lambda \dot{\Phi}_b^i$ is a Doppler measurement (or carrier time difference).

$$\vec{e} \cdot (\vec{v_r} + \vec{\delta v_r}) - \dot{B}_r = \vec{e} \cdot \vec{R}^i - \dot{b}^i - \lambda \dot{\Phi}_r^i, \qquad \text{[Equation 2]}$$

where $\vec{v}_r$ is velocity information about the follower, $\vec{\delta v}_r$ is a velocity estimate error, $\vec{e}$ is a line-of-sight vector, $\dot{B}_r$ is the drift of the clock error of the follower, $\vec{R}^i$ and $\dot{b}^i$ are the satellite orbital velocity and the drift of the satellite clock error, and $\lambda \dot{\Phi}_r^i$ is a Doppler measurement (or carrier time difference).

Each of the leader and the follower may calculate a velocity estimate of each vehicle by multiplying Equations 1 and 2 by an observation matrix and a weighting matrix, respectively, as shown in Equation 3 below. That is, the velocity information about each vehicle may include a velocity estimate calculated in Equation 3.

$$\begin{bmatrix} \vec{v} + \vec{\delta v} \\ B \end{bmatrix} = (H^T W H)^{-1} W H^T y, \quad \text{[Equation 3]}$$

where H is an observation matrix composed of a line-of-sight vector, W is a weighting matrix calculated from measurement noise, and y denotes a right-hand side term of Equations 1 and 2.

In one aspect, the follower may differentiate the velocity information $\vec{v}_r(t-1)$ about the follower and the velocity information about the leader, and calculate the baseline vector $\vec{x}(t)$ with the correction age compensated, through an operation based on the differential velocity information $\vec{x}(t-dt)$ (that is, the velocity of the baseline vector) and the baseline vector $\vec{x}(t-dt)$.

Specifically, the follower may calculate the baseline vector $\vec{x}(t-dt)$ through the difference between the carrier phase measurement $\Phi_r(t-dt)$ for the follower and the carrier phase measurement $\Phi_b(t-dt)$ for the leader at time t−dt.

In addition, since the velocity errors $\vec{\delta v}_b$ and $\vec{\delta v}_r$ of the leader and the follower at a close distance are almost the same, the error component may be removed by differentiating Equation 1 and Equation 2.

Accordingly, the follower may calculate the velocity of the baseline vector through Equation 4 below, which differentiates the velocity information about the follower and the velocity information about the leader at time t−dt.

$$\vec{x}(t-dt) = \vec{v}_r(t-dt) - \vec{v}_b(t-dt), \quad \text{[Equation 4]}$$

In addition, the follower may calculate a baseline vector at current time t, i.e., a baseline vector with the correction age dt compensated through Equation 5 below, which is based on the velocity $\vec{x}(t-dt)$ of the baseline vector calculated in Equation 4 based on the baseline vector estimated at time t−dt.

$$\vec{x}(t) = \vec{x}(t-td) + \vec{x}(t-dt) \cdot dt, \quad \text{[Equation 5]}$$

When the leader does not provide synchronized the GNSS measurements including the carrier phase measurement $\Phi_b(t-dt_\Phi)$ for the leader and the velocity information $\vec{v}_b(t-dt_v)$ about the leader (that is, $dt_\Phi$ is different from $dt_v$), the follower may calculate a baseline vector with the correction age dt compensated through Equation 6 below, which is based on the sampling time interval information $\Delta t_v$ for the velocity information about the leader.

$$\vec{x}(t) = \vec{x}(t - dt_\Phi) + \sum_{dt_v = dt_\Phi}^{0} \left( \vec{v}_r(t - dt_v) - \vec{v}_b(t - dt_v) \right) \cdot \Delta t_v, \quad \text{[Equation 6]}$$

In addition, when correction message is not received within a certain period of time after the current time t, the follower may calculate a baseline vector at time t+$dt_{lat}$ through Equation 7 below, which is based on the final velocity component $\vec{v}_b(t-dt_v)$ output by the leader and the velocity component $\vec{v}_r(t-dt)$ estimated in real time by the follower.

$$\vec{x}(t + dt_{lat}) = \vec{x}(t - dt_\Phi) + \sum_{dt_v = dt_v}^{0} \left( \vec{v}_r(t - dt_v) - \vec{v}_b(t - dt_v) \right) \cdot \Delta t_v + \sum_{dt=0}^{dt_{lat}} \left( \vec{v}_r(t + dt) - \vec{v}_b(t) \right) \cdot \Delta t_r, \quad \text{[Equation 7]}$$

Here, $\Delta t_r$ denotes a sampling time interval for velocity information about the follower.

FIG. 5 is a diagram illustrating a follower according to another embodiment.

In other words, FIG. 5 is a diagram illustrating another example of the follower according to the embodiment described with reference to FIGS. 1 to 4. In the following description with reference to FIG. 5, redundant description of parts already described with reference to FIGS. 1 to 4 will be omitted.

Referring to FIG. 5, a follower 500 according to another embodiment may include a correction message receiver 510, a relative positioning result calculator 520, and a relative positioning result corrector 530.

The correction message receiver 510 according to the other embodiment may receive correction message including velocity information about a leader and GNSS raw measurements of the leader from the leader.

In one aspect, the leader may output velocity information and GNSS raw measurements of the leader in an asynchronous manner. Preferably, the leader may output the velocity information about the leader at a higher rate than the GNSS raw measurements of the leader.

In addition, the GNSS measurements of the leader may include at least one of a pseudorange measurement, a carrier measurement, and a Doppler measurement for the leader received from at least one satellite, but is not limited thereto. It may include previously known information that a terminal can receive from a satellite.

For example, the correction message receiver 510 may be the correction message receiver described with reference to FIG. 3.

In one aspect, the leader may calculate velocity information about the leader through a difference between the position information about of the leader at a first preset time and the position information about the leader at a second preset time.

In addition, the leader may calculate the velocity information about the leader using sensors such as an inertial navigation system.

Preferably, the leader may calculate the velocity information about the leader through an operation based on a satellite line-of-sight vector calculated based on the position of the leader and a Doppler measurement for the leader.

In one aspect, the correction message received by the correction message receiver 510 may further include position information about the leader.

The relative positioning result calculator 520 according to the other embodiment may calculate a relative positioning result between the leader and the follower based on the GNSS raw measurements of the leader.

In one aspect, the relative positioning result calculator 520 may calculate the relative positioning result based on the national marine electronics association (NMEA), which is a standard format of the positioning result.

In addition, the relative positioning result calculator 520 may calculate the relative positioning result based on a three-dimensional result provided by a unique output of each receiver (i.e., the follower).

The relative positioning result corrector 530 according to the other embodiment may calculate a corrected relative positioning result through an operation based on the calculated relative positioning result and the velocity information about the leader.

In one aspect, the relative positioning result corrector 530 may calculate the corrected relative positioning result through an operation based on a correction age according to reception of the calculated relative positioning result, the velocity information about the leader, and the correction message.

FIG. 6 is a diagram illustrating a second operation example of the global positioning system according to the one embodiment.

Referring to FIG. 6, reference numeral 600 represents an example of calculating a relative positioning result by correcting an error according to movement of a leader while the leader and a follower are continuously moving according to the second operation example.

For example, the leader may be the leader described with reference to FIG. 2, and the follower may be the follower described with reference to FIG. 5.

According to reference numeral 600, in the global positioning system according to the embodiment, the leader, which serves as the reference station, is not stationary but continuously moves, unlike the existing reference station whose position is fixed. Accordingly, the position of the leader at time t-dt when correction message is generated (output) may be different from the position of the leader at current time t when the output correction message is applied to the follower.

In other words, when the position solution of the RTK calculated at time t-dt is synchronized with the current time t through the double difference process, the synchronized relative positioning result and the relative positioning actually calculated at time t are substantially the same in the system that is based on a conventional stationary reference station. However, when the leader, which is a reference station, moves, a result approximating the actual relative positioning result may be obtained only when compensation is performed by the amount of movement of the leader.

Accordingly, the follower may calculate a relative positioning result by correcting an error due to movement of the leader based on the velocity information about the follower and the velocity information about the leader.

Specifically, the leader may calculate the velocity information about the leader, and provide the follower with the calculated velocity information about the leader, along with the correction message including position information and global positioning measurement information.

In one aspect, the velocity information $\vec{v}_l$ about the leader, which is three-dimensional velocity information, may be calculated through the difference between the position information about the leader at a first preset time (e.g., t-dt) and the position information about the leader in a second preset time (e.g., t).

In other words, the leader may calculate the velocity information $\vec{v}_l$ about the leader through Equation 8, which includes the difference between two consecutive points of the leader.

$$\vec{v}_l(t) = \frac{\vec{x}_l(t) - \vec{x}_l(t-dt)}{dt} \qquad \text{[Equation 8]}$$

Preferably, the velocity information $\vec{v}_l$ about the leader may be calculated through Equation 9 below, which is based on the line-of-sight vector $\vec{e}$ of the satellite calculated based on the position of the leader, and a Doppler measurement $\lambda \dot{\Phi}_l^I$ (or time difference of the carrier) for the leader.

$$\vec{e} \cdot \vec{v}_l - \dot{B}_l \cong \vec{e} \cdot \vec{R}^s - \dot{b}^I - \lambda \dot{\Phi}_l^I \qquad \text{[Equation 9]}$$

where $\vec{e}$ denotes the line-of-sight vector, $\dot{B}_l$ denotes the change rate of the clock error of the leader, $\vec{R}^s$ and $\dot{b}^I$ denote the satellite orbital velocity and the change rate of the satellite clock error, and $\lambda \dot{\Phi}_l^I$ is the Doppler measurement (or carrier time difference).

The follower may receive correction message from the leader, and output a relative positioning result at time t estimated from the correction message generated at time t-dt through RTK positioning. For example, the follower may use a standard positioning result format called NMEA, or may use a three-dimensional result provided by a unique output of each receiver. It is told that a general RTK rover uses its own velocity estimates, $\vec{v}_r$, to compensate for the dt in the conventional RTK case.

Thereafter, the calculated relative positioning result $\vec{b}(t|t-dt)$ does not reflect the movement of the leader. Accordingly, the follower may calculate a relative positioning result by correcting an error according to the movement of the leader through Equation 10 below, based on the correction age dt according to reception of the velocity information $\vec{v}_l$ about the leader and the correction message.

$$\vec{b}(t)_{synch,MNRTK} = \vec{b}(t|t-dt)_{synch,RTK} - \vec{v}_l(t) \cdot dt \qquad \text{[Equation 10]}$$

FIGS. 7A and 7B depict a result of relative positioning between vehicles calculated through a global positioning system according to one embodiment.

Referring to FIGS. 7A and 7B, reference numeral 710 represents a relative positioning result between vehicles calculated using the existing RTK technique, and reference numeral 720 represents a relative positioning result between vehicles calculated through the global positioning system according to one embodiment.

According to reference numerals 710 and 720, the existing RTK technique has relatively high accuracy in scenario 1, in which the leader is hovering, but produces a large error with respect to the actual baseline in scenario 2, in which the leader moves.

On the other hand, in the global positioning system according to the embodiment, it may be confirmed that the accuracy of the relative positioning result is consistently derived at a level of 10 cm regardless of scenario 1 and scenario 2, that is, regardless of the movement of the leader.

Consequently, according to the present disclosure, the data throughput, transmission amount, and power consumption may be minimized by outputting correction message in an asynchronous manner.

In addition, in order to quickly output the relative positioning result, a baseline vector with the correction age compensated may be calculated based on the velocity information about the leader output at a high rate.

Further, the accuracy of the relative positioning result between vehicles may be improved by compensating for an error caused by the movement of the leader vehicle serving as a reference station.

Although preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

Description of Symbols

500: FOLLOWER
510: CORRECTION MESSAGE RECEIVER
520: RELATIVE POSITIONING RESULT CALCULATOR
530: RELATIVE POSITIONING RESULT CORRECTOR

What is claimed is:

1. A follower vehicle of a global positioning system, comprising:
   a correction message receiver configured to receive correction message including velocity information about a leader vehicle and GNSS raw measurements of the leader vehicle from the leader vehicle;
   a relative positioning result calculator configured to calculate a relative positioning result between the leader vehicle and the follower vehicle based on the GNSS raw measurements of the leader vehicle; and
   a relative positioning result corrector configured to calculate a corrected relative positioning result through an operation based on the calculated relative positioning result and the velocity information about the leader vehicle.

2. The follower vehicle of claim 1, wherein the GNSS raw measurements of the leader vehicle comprises at least one of a pseudorange measurement, a carrier measurement, or a Doppler measurement for the leader vehicle received from at least one satellite.

3. The follower vehicle of claim 2, wherein the leader vehicle calculates the velocity information about the leader vehicle through an operation based on a line-of-sight vector of the satellite calculated based on a position of the leader vehicle and the Doppler measurement for the leader vehicle.

4. The follower vehicle of claim 1, wherein the leader vehicle calculates the velocity information about the leader vehicle through a difference between position information about the leader vehicle at a first preset time and position information about the leader vehicle at a second preset time.

5. The follower vehicle of claim 1, wherein the leader vehicle comprises an inertial navigation system,
   wherein the leader vehicle calculates the velocity information about the leader vehicle using the inertial navigation system.

6. The follower vehicle of claim 2, wherein the relative positioning result corrector calculates the corrected relative positioning result through an operation based on a correction age according to reception of the calculated relative positioning result, the velocity information about the leader vehicle, and the correction message.

7. The follower vehicle of claim 1, wherein the relative positioning result calculator calculates the relative positioning result using a standard format for the positioning result, the standard being national marine electronics association (NMEA).

8. The follower vehicle of claim 1, wherein the correction message further includes position information about the leader vehicle.

9. The follower vehicle of claim 1, wherein the leader vehicle outputs the velocity information about the leader vehicle and the GNSS raw measurements of the leader vehicle in an asynchronous manner.

10. The follower vehicle of claim 9, wherein the leader vehicle outputs the velocity information about the leader vehicle at a higher rate than the GNSS raw measurements of the leader vehicle.

* * * * *